(12) United States Patent
Nagahama et al.

(10) Patent No.: US 11,745,801 B2
(45) Date of Patent: Sep. 5, 2023

(54) VEHICLE BODY STRUCTURE

(71) Applicant: HONDA MOTOR CO., LTD., Tokyo (JP)

(72) Inventors: Taku Nagahama, Wako (JP); Kodai Baiju, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/638,908

(22) PCT Filed: Sep. 2, 2020

(86) PCT No.: PCT/JP2020/033282
§ 371 (c)(1),
(2) Date: Feb. 28, 2022

(87) PCT Pub. No.: WO2021/065310
PCT Pub. Date: Apr. 8, 2021

(65) Prior Publication Data
US 2022/0297760 A1    Sep. 22, 2022

(30) Foreign Application Priority Data
Oct. 4, 2019  (JP) .................. 2019-183601

(51) Int. Cl.
| | | |
|---|---|---|
| *B62D 25/02* | (2006.01) | |
| *B62D 25/04* | (2006.01) | |
| *B62D 27/02* | (2006.01) | |
| *B62D 25/06* | (2006.01) | |

(52) U.S. Cl.
CPC .............. *B62D 25/02* (2013.01); *B62D 25/04* (2013.01); *B62D 25/06* (2013.01); *B62D 27/023* (2013.01)

(58) Field of Classification Search
CPC ........ B62D 25/02; B62D 25/04; B62D 25/06; B62D 27/203
USPC ................ 296/23.01, 3, 193.06, 209, 29, 30
See application file for complete search history.

(56) References Cited

U.S. PATENT DOCUMENTS

2014/0354012 A1    12/2014  Naga

FOREIGN PATENT DOCUMENTS

| DE | 102016118366 | 3/2018 |
|---|---|---|
| JP | 03-045378 | 4/1991 |
| JP | 2002-331960 | 11/2002 |
| JP | 2010-167978 | 8/2010 |

(Continued)

OTHER PUBLICATIONS

International Search Report and Written Opinion for International Application No. PCT/JP2020/033282 dated Oct. 27, 2020 14 pages.

*Primary Examiner* — Dennis H Redder
(74) *Attorney, Agent, or Firm* — AMIN, TUROCY & WATSON, LLP

(57) ABSTRACT

A vehicle body structure 10 formed a first ridgeline 35, a second ridgeline 36, and a concave portion 33 in a roof side inner panel 26 of a roof side rail 16. The first ridgeline continuously extends from a front end to a rear end of the roof side rail so that a load input from a front and rear direction of a vehicle body is able to be transmitted to the roof side rail. A second ridgeline includes a bent portion 38 which is recessed toward a first ridgeline to form a concave portion at a position matching a roof arch connection portion in the front and rear direction of the vehicle body. An upper end portion of a center pillar 14 is joined to the concave portion.

12 Claims, 10 Drawing Sheets

(56) References Cited

FOREIGN PATENT DOCUMENTS

| | | |
|---|---|---|
| JP | 2016-088459 | 5/2016 |
| WO | 2013/099456 | 7/2013 |

VEHICLE BODY STRUCTURE

TECHNICAL FIELD

The present invention relates to a vehicle body structure.

BACKGROUND ART

In a vehicle body structure, a roof side rail extends in a front and rear direction of a vehicle body on a lateral side of an upper portion of the vehicle body, a side sill extends in the front and rear direction of the vehicle body on a lateral side of a lower portion of the vehicle body, and a center pillar is joined to the side sill and the roof side rail (for example, see Patent Document 1 (German Patent Application Publication No. 102016118366)).

When a collision load is input to the center pillar due to a side collision, the input collision load is transmitted to the side sill through a lower end portion of the center pillar and is transmitted to the roof side rail through an upper end portion of the center pillar.

A roof arch is joined to the roof side rail and the roof arch extends in a vehicle width direction. Thus, the collision load transmitted to the roof side rail is transmitted to the roof arch through the roof side rail.

SUMMARY OF INVENTION

Technical Problem

Here, the center pillar is curved toward an interior side above a belt line and is narrowed to widen front and rear window glasses. The collision load is supported by the roof arch in such a manner that the collision load input to the center pillar due to the side collision is transmitted to the roof arch through the roof side rail. However, it is desired to put into practical use a technique for efficiently transmitting the collision load input to the center pillar to the roof arch through the roof side rail.

An aspect of the present invention provides a vehicle body structure capable of efficiently transmitting a collision load input to a center pillar due to a side collision to a roof arch.

Solution to Problem (1) A vehicle body structure according to the present invention includes: a roof side rail which extends in a front and rear direction of a vehicle body on a lateral side above the vehicle body and which forms a hollow closed cross section by an inner wall and an outer wall; a roof arch which is joined to a roof arch connection portion of the inner wall; and a center pillar of which an upper end portion is joined to the roof side rail and a lower end portion is joined to a side sill, wherein the outer wall includes a first ridgeline and a second ridgeline which are provided above and below and a concave portion which is provided in the second ridgeline, wherein the first ridgeline continuously extends from a front end to a rear end of the roof side rail so that a load input from the front and rear direction of the vehicle body is able to be transmitted to the roof side rail, wherein the second ridgeline includes a bent portion which is recessed toward the first ridgeline to form the concave portion at a position matching the roof arch connection portion in the front and rear direction of the vehicle body, and wherein the upper end portion of the center pillar is joined to the concave portion.

According to the aspect (1), the first ridgeline was continuously extended from the front end to the rear end of the roof side rail without the bent portion so that the load input from the front and rear direction of the vehicle body was able to be transmitted to the roof side rail. Accordingly, a collision load can be supported by the roof side rail by transmitting the collision load (load) due to a front surface collision or a rear surface collision by the first ridgeline.

Then, the bent portion was formed at a position matching the roof arch connection portion in the second ridgeline and the concave portion was formed in the outer wall. The upper end portion of the center pillar was joined to the concave portion. Thus, the upper end portion of the center pillar can be disposed at a position close to the roof arch. Accordingly, the collision load input to the center pillar due to a side collision can be efficiently transmitted from the upper end portion of the center pillar to the roof arch and the transmission loss to the roof arch can be reduced.

(2) In the aspect (1), an axis of the roof arch and an axis of the center pillar may intersect each other at a cross section center of the roof side rail.

Here, when a side collision load due to the side collision is input to the center pillar, a bending moment around the cross section center of the roof side rail acts on the upper end portion of the center pillar. Here, in the aspect (2), the axis of the roof arch and the axis of the center pillar intersect each other at the cross section center of the roof side rail. Thus, the bending moment around the cross section center of the roof side rail can be suppressed by the roof arch. Accordingly, the collision load input to the center pillar due to the side collision can be efficiently transmitted from the upper end portion of the center pillar to the roof arch.

(3) In the aspect (1) or (2), the roof arch may be formed with a first hat cross section opening upward such that an end portion is bent downward in front of the inner wall of the roof side rail, and the center pillar may include an inner panel which is formed with a second hat cross section to be overlapped along the first hat cross section of the end portion.

According to the aspect (3), the inner panel of the center pillar was formed to have the second hat cross section. This second hat cross section was overlapped along the first hat cross section of the roof arch. Thus, the side collision load input to the inner panel of the center pillar can be efficiently transmitted to the roof arch.

Therefore, the depth of the outer panel formed to have the hat cross section can be made shallow while securing the transmission of the load from the center pillar to the roof arch. Accordingly, the door window frame of the vehicle can be set to be thin and the surface of the vehicle can be made into a flash surface.

The flash surface means a surface structure that eliminates steps as much as possible from the surface of the vehicle in order to reduce the air resistance of the vehicle.

(4) In any one of the aspects (1) to (3), the center pillar may include a stiffener which is disposed therein and includes a vertical wall extending in a vehicle width direction. In the stiffener, an upper end portion of the vertical wall may be disposed in the concave portion and the vertical wall may project from an outer panel to the inner panel of the center pillar between the roof side rail and a belt line.

According to the aspect (4), the upper end portion of the vertical wall of the stiffener was disposed in the concave portion. Further, the vertical wall of the stiffener projected from the outer panel to the inner panel between the roof side rail and the belt line. Thus, the center pillar which is curved toward the interior side between the roof side rail and the belt line can be reinforced by the stiffener against the load of the vehicle width direction.

Accordingly, the stiffener can suppress the cross section of the center pillar from being deformed to collapse in the vehicle width direction, for example, when a minus bending moment acts on the center pillar in the vicinity of the roof side rail which is the upper fulcrum of the side collision.

(5) In the aspect (4), the center pillar may include a pillar bulkhead which includes a partition wall disposed horizontally above the belt line.

According to the aspect (5), the partition wall of the pillar bulkhead was horizontally disposed in the center pillar above the belt line. Thus, the center pillar in the range above the belt line can be reinforced by the pillar bulkhead against the load in the front and rear direction of the vehicle body.

Accordingly, the pillar bulkhead can suppress the cross section of the center pillar from being deformed to collapse in the front and rear direction of the vehicle body, for example, when a plus bending moment acts on the center pillar in the range above the belt line interfering with a collision object due to the side collision.

(6) In the aspect (4) or (5), the stiffener may be formed to have a U-shaped cross section along a top portion and a pair of side walls of the outer panel of the center pillar and extend in the up and down direction to intersect the belt line.

According to the aspect (6), the stiffener is formed to have the U-shaped cross section along the top portion and the pair of side walls in the outer panel of the center pillar. Further, the stiffener was extended in the up and down direction to intersect the belt line. Thus, the stiffener can increase the strength and rigidity in the range of the center pillar interfering with a collision object due to the side collision. That is, the collision load input to the center pillar due to the side collision can be distributed to the upper roof side rail and the lower side sill. Accordingly, the collision load input to the center pillar due to the side collision can be supported by the roof side rail and the side sill.

(7) In any one of the aspects (4) to (6), the stiffener may include a maximum plate thickness portion between the belt line and the roof side rail.

According to the aspect (7), a portion between the belt line and the roof side rail in the stiffener was the maximum plate thickness portion. Thus, the strength and rigidity of the portion in which the maximum bending moment occurs in the event of the side collision can be increased. Accordingly, the collision load input due to the side collision can be satisfactorily distributed to the upper roof side rail and the lower side sill.

(8) In any one of the aspects (4) to (6), the concave portion may include a bottom portion which is connected to a lower flange of the roof side rail and a top portion which projects from the bottom portion to the bent portion, and the outer panel of the center pillar may include an upper end portion which surrounds an upper end portion of the stiffener disposed in the concave portion and is joined to the bottom portion and the top portion.

According to the aspect (8), the upper end portion of the stiffener was surrounded by the upper end portion of the outer panel and the upper end portion surrounding the upper end portion of the stiffener was joined to the bottom portion and the top portion of the concave portion. Thus, the upper end portion of the center pillar can be firmly joined to the roof side rail. Accordingly, the collision load input to the center pillar can be satisfactorily transmitted to the roof arch through the roof side rail.

(9) In any one of the aspects (1) to (8), the roof side rail may include a rail bulkhead which has a cross section shielding portion formed on at least one side wall of the roof arch and the center pillar to be aligned in the front and rear direction of the vehicle body and is joined to the outer wall or the inner wall.

According to the aspect (9), the roof side rail was provided with the rail bulkhead. The cross section shielding portion of the rail bulkhead was aligned with at least one side wall of the roof arch and the center pillar in the front and rear direction of the vehicle body. Accordingly, the collision load input to the center pillar can be satisfactorily transmitted to the roof arch through the rail bulkhead.

(10) In the aspect (9), the rail bulkhead may be formed to have any one of a hat cross section, a crank cross section, and a U-shaped cross section.

According to the aspect (10), the rail bulkhead was formed to have any one of the hat cross section, the crank cross section, and the U-shaped cross section. Accordingly, the rail bulkhead can be easily manufactured and the rail bulkhead can be easily joined to the roof side rail.

(11) In any one of the aspects (1) to (10), the roof side rail may include the outer wall which is formed to have a U-shaped cross section opening toward the inside of the vehicle width direction and has a roof top portion to which a roof panel is joined and the inner wall which is formed to have an L-shaped cross section to be able to be joined to the outer wall from the inside of the vehicle width direction.

According to the aspect (11), the outer wall of the roof side rail was formed to have the U-shaped cross section opening toward the inside of the vehicle width direction and the roof top portion was formed in the outer wall. The inner wall of the roof side rail was formed to have an L-shaped cross section to be joined to the outer wall. Thus, the roof top portion can be brought closer to the closed cross section of the roof side rail in the up and down direction. Accordingly, the height of the vehicle interior space can be suitably secured in a state in which the vertical position (that is, the vehicle height) of the roof panel is lowered.

(12) In the aspect (9) or (10), the roof side rail may include a reinforcing member facing the rail bulkhead.

According to the aspect (12), the roof side rail is provided with the reinforcing member and the reinforcing member is opposed to the rail bulkhead. Thus, the collision load input to the center pillar can be satisfactorily received by the reinforcing member and the received collision load can be transmitted from the reinforcing member to the rail bulkhead. Accordingly, the collision load input to the center pillar can be satisfactorily transmitted to the roof arch.

Advantageous Effects of Invention

According to aspects of the present invention, a bent portion was formed in a second ridgeline and a concave portion was formed in an outer wall. An upper end portion of a center pillar was joined to the concave portion. Accordingly, a collision load input to the center pillar due to a side collision can be efficiently transmitted to a roof arch.

DESCRIPTION OF EMBODIMENTS

Figure 1:
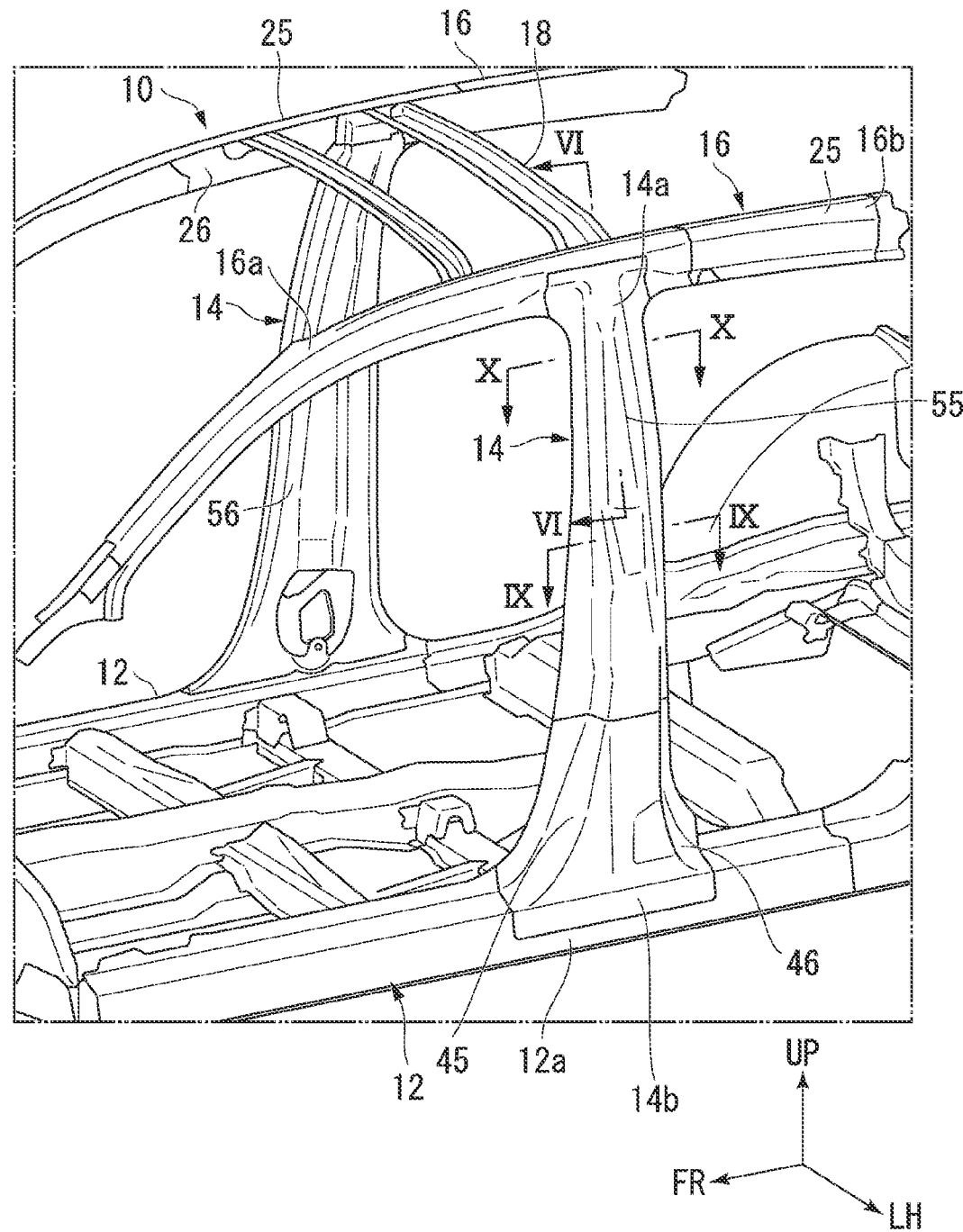
FIG. 1 is a perspective view showing a vehicle body structure according to an embodiment of the present invention.

Hereinafter, an embodiment of the present invention will be described with reference to the drawings. In the drawings of the embodiment, the arrow FR indicates the front side of the vehicle, the arrow UP indicates the upper side of the vehicle, and the arrow LH indicates the left side of the vehicle.

A vehicle body structure 10 of the embodiment has a substantially symmetrical configuration, the same reference numerals are given to the left and right constituent members, and the configuration on the left side will be mainly described in detail.

<Vehicle Body Structure>

As shown in FIG. 1, the vehicle body structure 10 includes a side sill 12, a center pillar 14, a roof side rail 16, and a roof arch 18.

The side sill 12 is formed in a hollow closed cross section extending in the front and rear direction of the vehicle body on the lateral side of the lower portion of the vehicle body. The center pillar 14 extends upward from a center portion 12a of the side sill 12 in the front and rear direction of the vehicle body. The roof side rail 16 is fixed to an upper end portion 14a of the center pillar 14. The roof side rail 16 is formed in a hollow closed cross section (see FIG. 4) extending in the front and rear direction of the vehicle body on the lateral side of the upper portion of the vehicle body. The roof arch 18 is joined to the roof side rail 16. The roof arch 18 is bridged over the left and right roof side rails 16.

<Side Sill>

Figure 2:
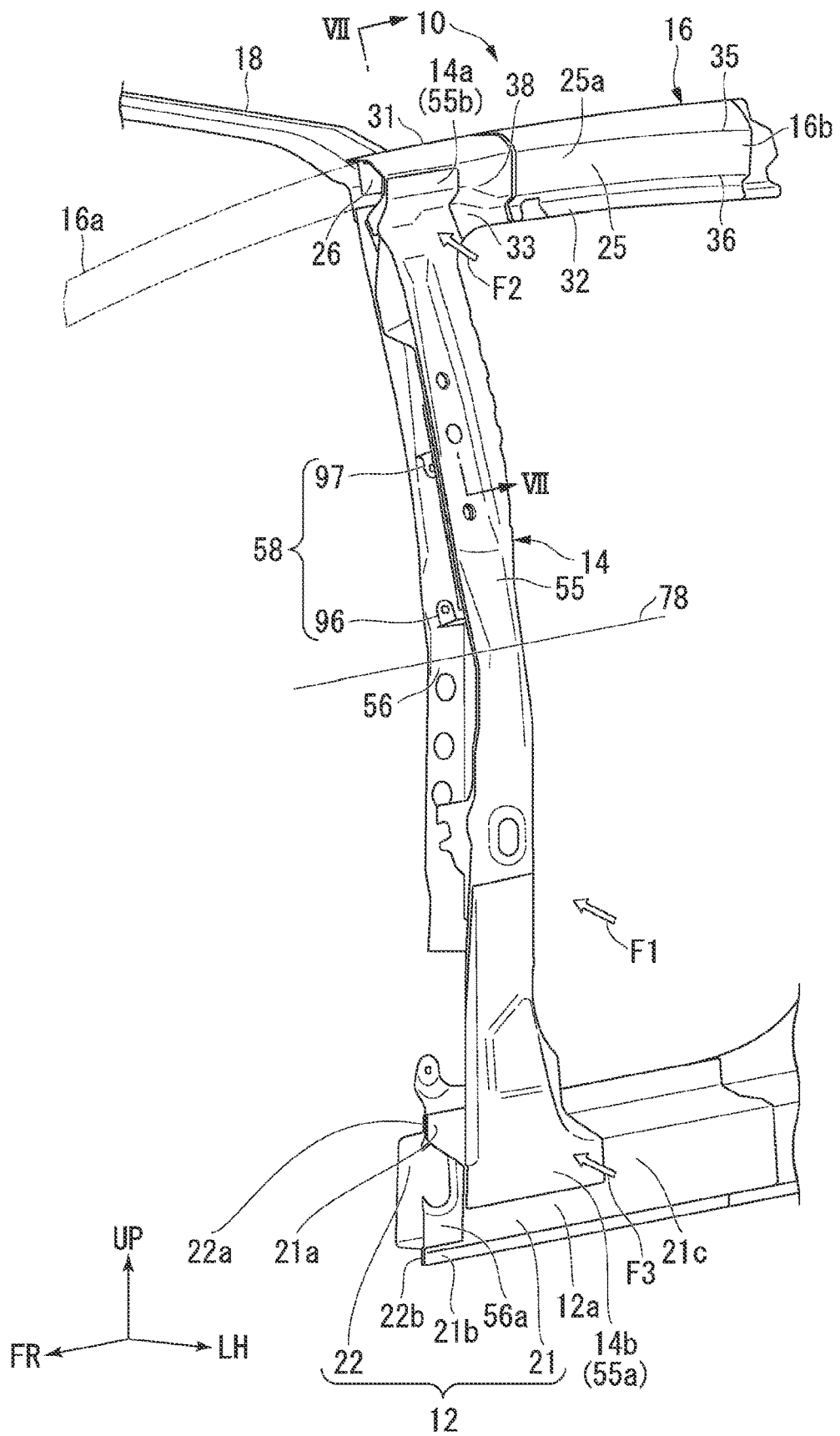
FIG. 2 is a perspective view showing a state in which the vehicle body structure of the embodiment is broken at a center pillar.

As shown in FIG. 2, the side sill 12 includes a side sill outer panel 21 and a side sill inner panel 22.

The side sill outer panel 21 is formed in a hat cross section including an upper flange 21a and a lower flange 21b. The side sill inner panel 22 is formed in a hat cross section including an upper flange 22a and a lower flange 22b.

The upper flanges 21a and 22a of the side sill outer panel 21 and the side sill inner panel 22 are joined to each other. The lower flanges 21b and 22b of the side sill outer panel 21 and the side sill inner panel 22 are joined to each other. Accordingly, the side sill 12 is formed in a hollow closed cross section by the side sill outer panel 21 and the side sill inner panel 22. In other words, the side sill 12 has a continuous hollow structure formed in the front and rear direction of the vehicle body. The side sill 12 is a skeleton member having high strength and rigidity with respect to a load in front and rear of the vehicle body.

<Roof Side Rail>

Figure 3:
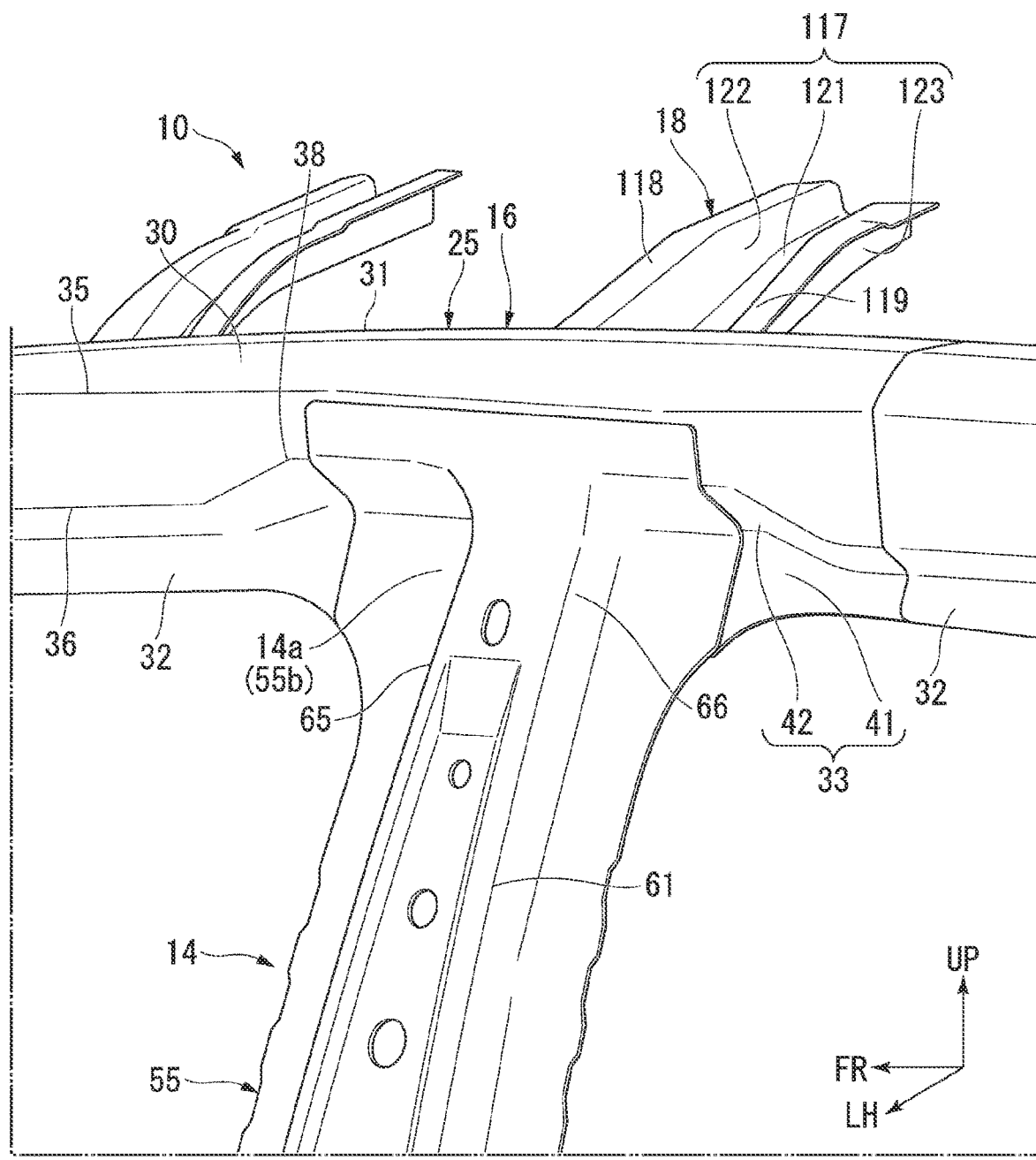
FIG. 3 is a perspective view showing a roof side rail and the center pillar of the vehicle body structure of the embodiment.
Figure 4:
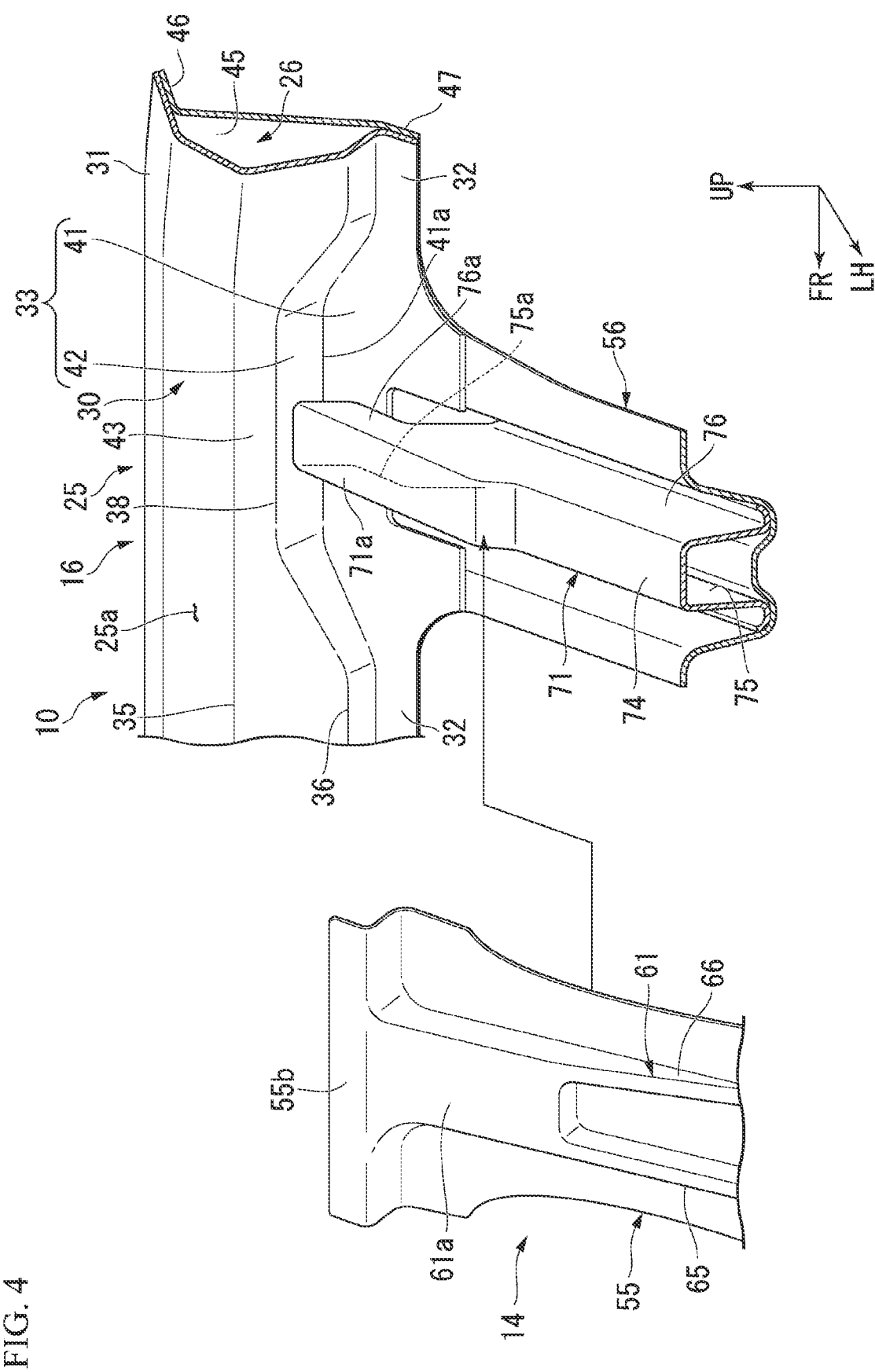
FIG. 4 is an exploded perspective view showing a state in which an outer panel is disassembled from the vehicle body structure of FIG. 3.
Figure 5:
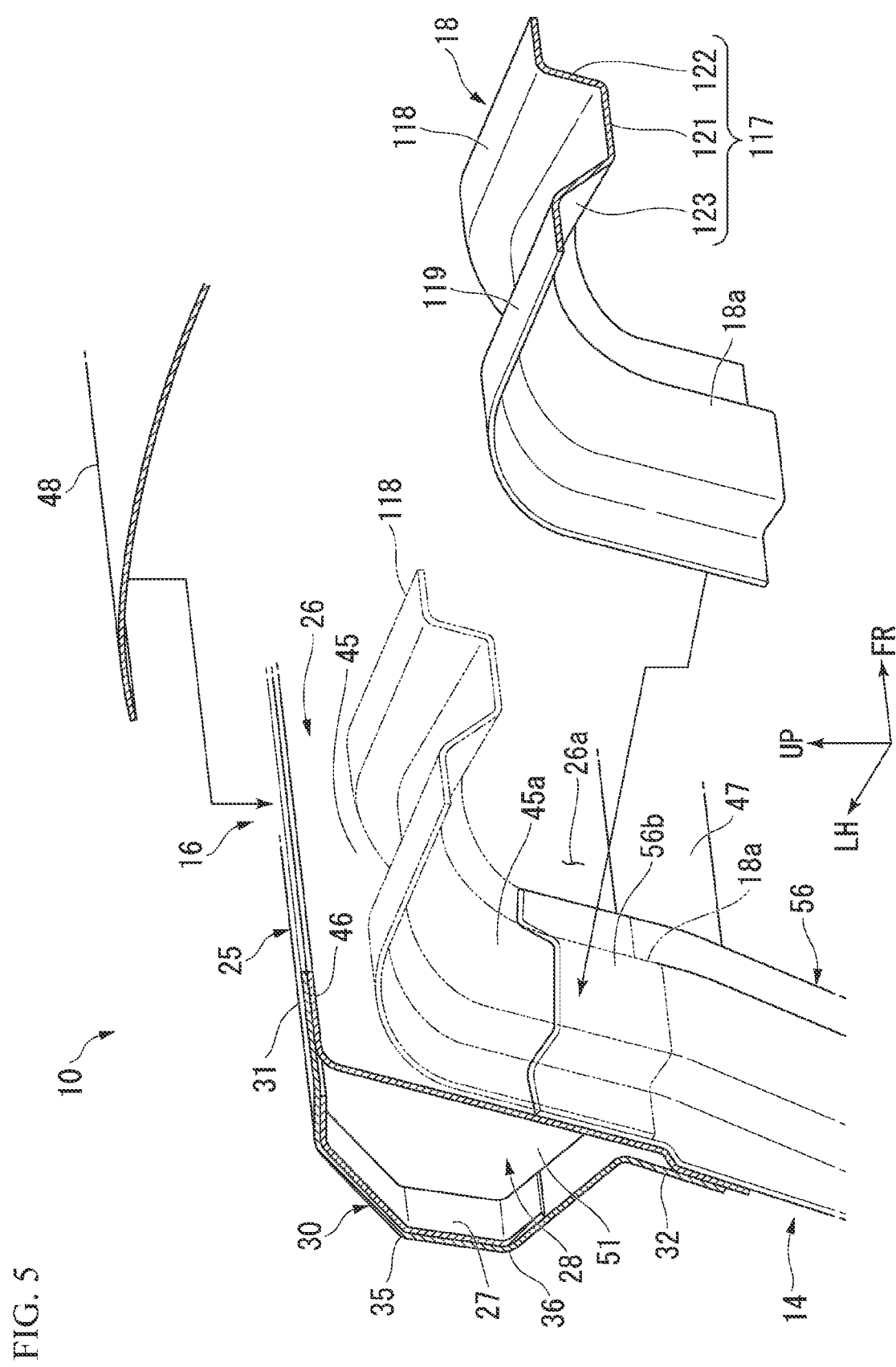
FIG. 5 is an exploded perspective view showing a roof arch and the roof side rail of the vehicle body structure of the embodiment.

As shown in FIGS. 3 to 5, the roof side rail 16 extends in the front and rear direction of the vehicle body on the lateral side above the vehicle body. The roof side rail 16 includes a roof side outer panel (outer wall) 25, a roof side inner panel (inner wall) 26, a rail reinforcing member (reinforcing member of claims) 27, and a rail bulkhead 28.

The roof side outer panel 25 is formed in a U-shaped cross section opening toward the inside of the vehicle width direction. The roof side outer panel 25 includes a roof bulging portion 30, an outer upper flange (roof top portion) 31, an outer lower flange (lower flange) 32, and a concave portion 33.

The roof bulging portion 30 bulges toward the outside of the vehicle width direction. The roof bulging portion 30 includes a first ridgeline 35 and a second ridgeline 36 which are provided with a gap therebetween in the up and down direction. The first ridgeline 35 protrudes toward the outside of the vehicle width direction in a V shape and continuously extends in a ridgeline shape from a front end 16a of the roof side rail 16 to a rear end 16b (see FIG. 1) thereof to have a substantially linear shape without a bent portion.

Thus, the strength and rigidity of the first ridgeline 35 are secured so that a load input from the front and rear direction of the vehicle body is able to be transmitted to the roof side rail 16. Accordingly, a load input from the front end 16a or the rear end 16b of the roof side rail 16 can be supported by the roof side rail 16.

The second ridgeline 36 is disposed below the first ridgeline 35. Similarly to the first ridgeline 35, the second ridgeline 36 protrudes toward the outside of the vehicle width direction to have a V shape and extends in the front and rear direction of the vehicle body. The second ridgeline 36 includes a bent portion 38 which is provided at a position facing a roof arch connection portion 45a to be described later. In other words, the bent portion 38 is provided at a position matching the roof arch connection portion 45a in the front and rear direction of the vehicle body. The bent portion 38 is formed to be recessed in a trapezoidal shape toward, for example, the first ridgeline 35. Since the bent portion 38 is formed in the second ridgeline 36, the concave portion 33 is formed below the bent portion 38 (that is, the bent portion 38).

The concave portion 33 is formed to be recessed toward the inside of the vehicle width direction. The concave portion 33 includes a bottom portion 41 and a top portion 42. The bottom portion 41 is connected to the outer lower flange 32. The bottom portion 41 is formed flatly to be flush with the outer lower flange 32. The top portion 42 projects from an upper end 41a of the bottom portion 41 to the bent portion 38. The top portion 42 is formed in, for example, a trapezoidal shape along the bent portion 38. The upper end portion 14a of the center pillar 14 (specifically, an upper end portion 55b of an outer panel 55 to be described later) is joined to the bottom portion 41 and the top portion 42 of the concave portion 33 and an upper portion 43 of the concave portion 33.

Additionally, another ridgeline may be further added to the roof side outer panel 25 in addition to the first ridgeline 35 and the second ridgeline 36.

The outer upper flange 31 projects from the upper edge of the roof bulging portion 30 toward the inside of the vehicle width direction. The outer lower flange 32 projects downward from the lower edge of the roof bulging portion 30 to be gradually inclined toward the outside of the vehicle width direction.

The roof side inner panel 26 is formed with an L-shaped cross section to be joined to the roof side outer panel 25 from the inside of the vehicle width direction. The roof side inner panel 26 includes a roof wall portion 45, an inner upper flange 46, and an inner lower flange 47. The roof wall portion 45 is disposed to block the opening of the roof bulging portion 30 from the inside of the vehicle width direction. The roof wall portion 45 includes the roof arch connection portion 45a to which the roof arch 18 to be described later is connected.

The inner upper flange 46 projects from the upper edge of the roof bulging portion 30 toward the inside of the vehicle width direction along the outer upper flange 31. The inner lower flange 47 projects downward along the outer lower flange 32 from the lower edge of the roof bulging portion 30 to be gradually inclined toward the outside of the vehicle width direction.

The inner upper flange 46 is joined to the outer upper flange 31 from below. The inner lower flange 47 is joined to the outer lower flange 32 from the inside of the vehicle width direction. Accordingly, the roof side rail 16 is formed to have a hollow closed cross section by the roof side outer panel 25 and the roof side inner panel 26. The roof side rail 16 is a highly rigid member that forms a vehicle body skeleton on the lateral side of the upper portion of the vehicle body. A roof panel 48 is joined to the outer upper flange of the roof side rail 16 from above.

In this way, the roof side outer panel 25 was formed to have a U-shaped cross section opening toward the inside of the vehicle width direction. The roof side outer panel 25 is provided with the outer upper flange 31 which projects toward the inside of the vehicle width direction.

The inner upper flange 46 of the roof side inner panel 26 projects toward the inside of the vehicle width direction along the outer upper flange 31. Thus, the outer upper flange 31 and the inner upper flange 46 can be arranged at the lower side to be closer to the hollow closed cross section of the roof side rail 16 in the up and down direction. The roof panel 48 is joined to the outer upper flange 31 from above. Accordingly, the height of the vehicle interior space can be suitably secured in a state in which the vertical position (that is, the vehicle height) of the roof panel 48 is lowered.

A rail reinforcing member 27 is joined to the inner surface of the roof side outer panel 25 inside the hollow closed cross section of the roof side rail 16. The rail reinforcing member 27 is a member that is formed along the inner surface of the roof bulging portion 30 to reinforce the roof side outer panel 25. The rail reinforcing member 27 is joined to a position facing the roof arch connection portion 45a of the roof side inner panel 26 in the inner surface of the roof bulging portion 30 in the front and rear direction of the vehicle body. The rail reinforcing member 27 is disposed at a position facing the rail bulkhead 28 to be described later.

Figure 6:
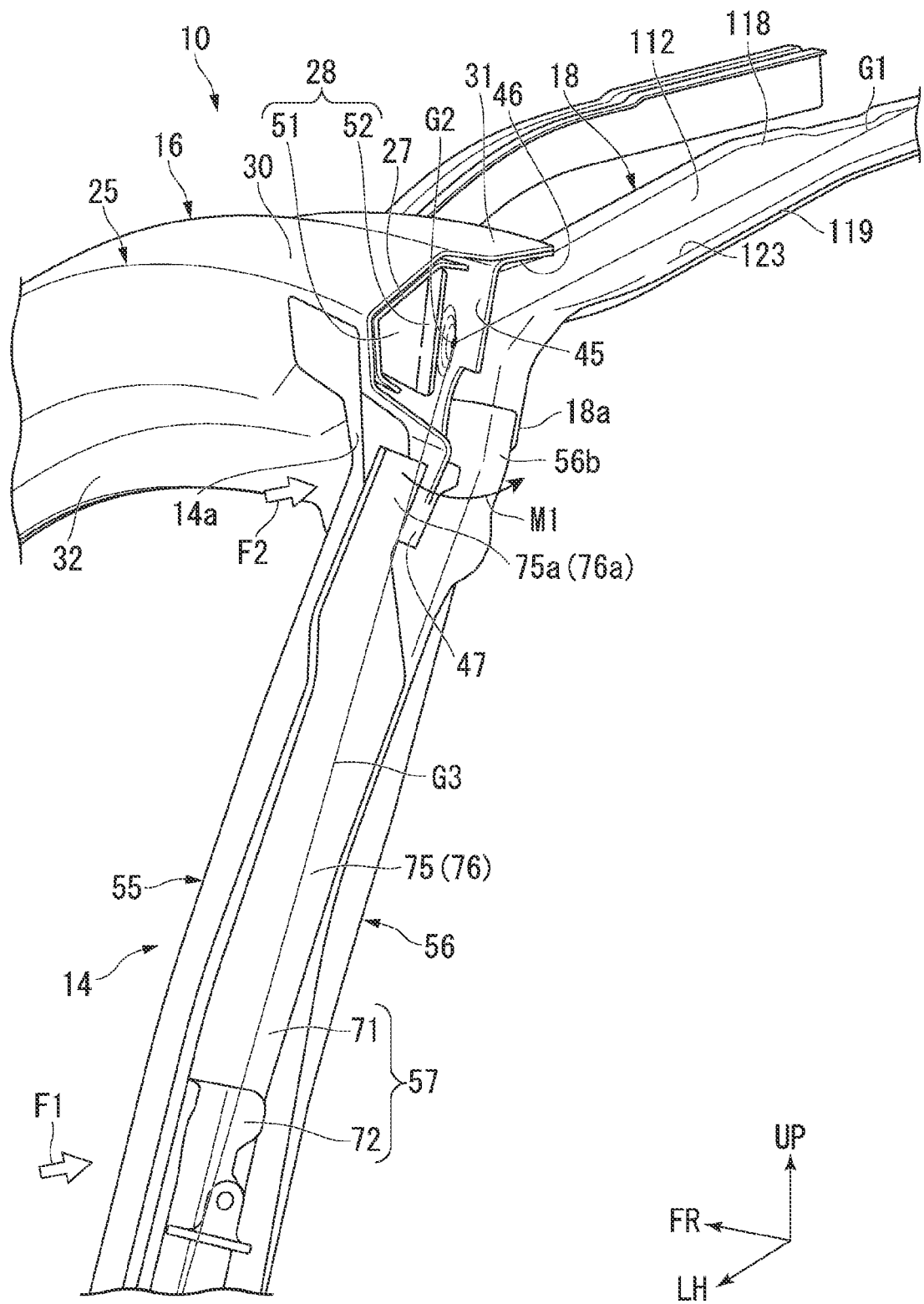
FIG. 6 is a perspective view showing a broken state along the line VI-VI of FIG. 1.
Figure 7:
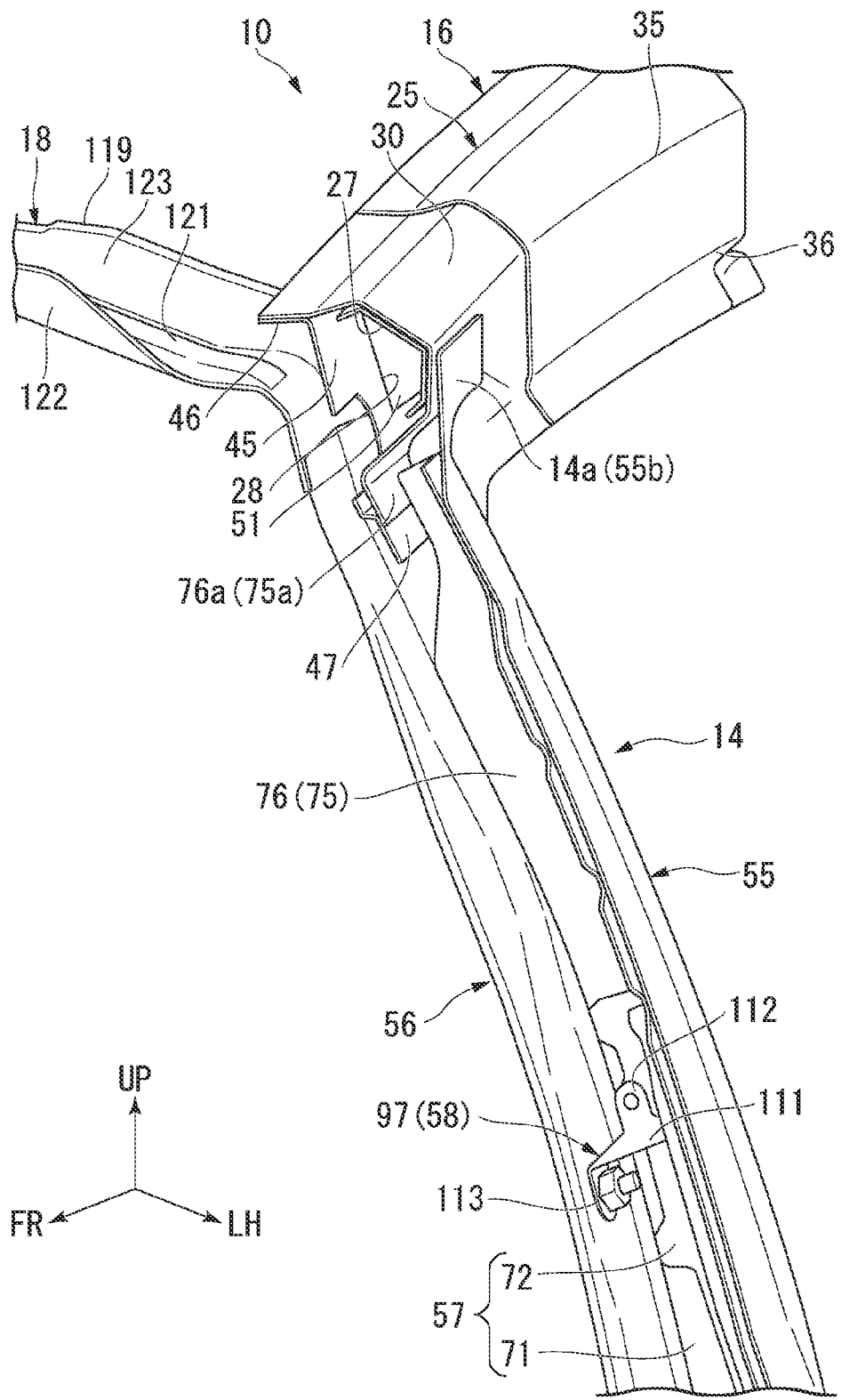
FIG. 7 is a perspective view showing a broken state along the line VII-VII of FIG. 2.

As shown in FIGS. 6 and 7, the rail bulkhead 28 is provided in the hollow closed cross section of the roof side rail 16. The rail bulkhead 28 includes a cross-section shielding portion 51 and a joint piece 52. The rail bulkhead 28 is formed to have a U-shaped cross section by the cross-section shielding portion 51 and the joint piece 52.

The cross-section shielding portion 51 is disposed toward the vehicle width direction to be aligned with, for example, an outer front side wall 65 of the center pillar 14 to be described later (see FIG. 3) and an arch front side wall 122 of the roof arch 18 to be described later in the front and rear direction of the vehicle body. Alternatively, the cross-section shielding portion 51 is disposed toward the vehicle width direction to be aligned with, for example, an outer rear side wall 66 of the center pillar to be described later (see FIG. 3) and an arch rear side wall 123 of the roof arch 18 to be described later in the front and rear direction of the vehicle body.

The outer front side wall 65 (side wall) and the outer rear side wall 66 (side wall) are a pair of side walls, one of the pair of side walls is the outer front side wall 65, and the other of the pair of side walls is the outer rear side wall 66. The arch front side wall 122 and the arch rear side wall 123 are a pair of side walls, one of the pair of side walls is the arch front side wall 122, and the other of the pair of side walls is the arch rear side wall 123.

In the cross-section shielding portion 51, for example, the joint piece 52 projects from the vicinity of the cross-section shielding portion 51 along the inner surface of the roof bulging portion 30 and the inner surface of the roof wall portion 45. The joint piece 52 is joined to the inner surface selected from the roof bulging portion 30, the roof wall portion 45, and the rail reinforcing member 27. In other words, the rail bulkhead 28 is joined to the roof side outer panel 25 or the roof side inner panel 26.

Additionally, the cross-section shielding portion 51 may be aligned with any one of the outer front side wall 65 of the center pillar 14 and the arch front side wall 122 of the roof arch 18 in the front and rear direction of the vehicle body. Alternatively, the cross-section shielding portion 51 may be aligned with any one of the outer rear side wall 66 of the center pillar 14 and the arch rear side wall 123 of the roof arch 18 in the front and rear direction of the vehicle body.

The rail bulkhead 28 is not limited to have the U-shaped cross section, but may be formed to have a hat cross section and a crank cross section. In this way, the rail bulkhead 28 is formed to have, for example, any one of a U-shaped cross section, a hat cross section, and a crank cross section. Accordingly, the rail bulkhead 28 can be easily manufactured and the rail bulkhead 28 can be easily joined to the roof side rail 16.

<Center Pillar>

Figure 8:
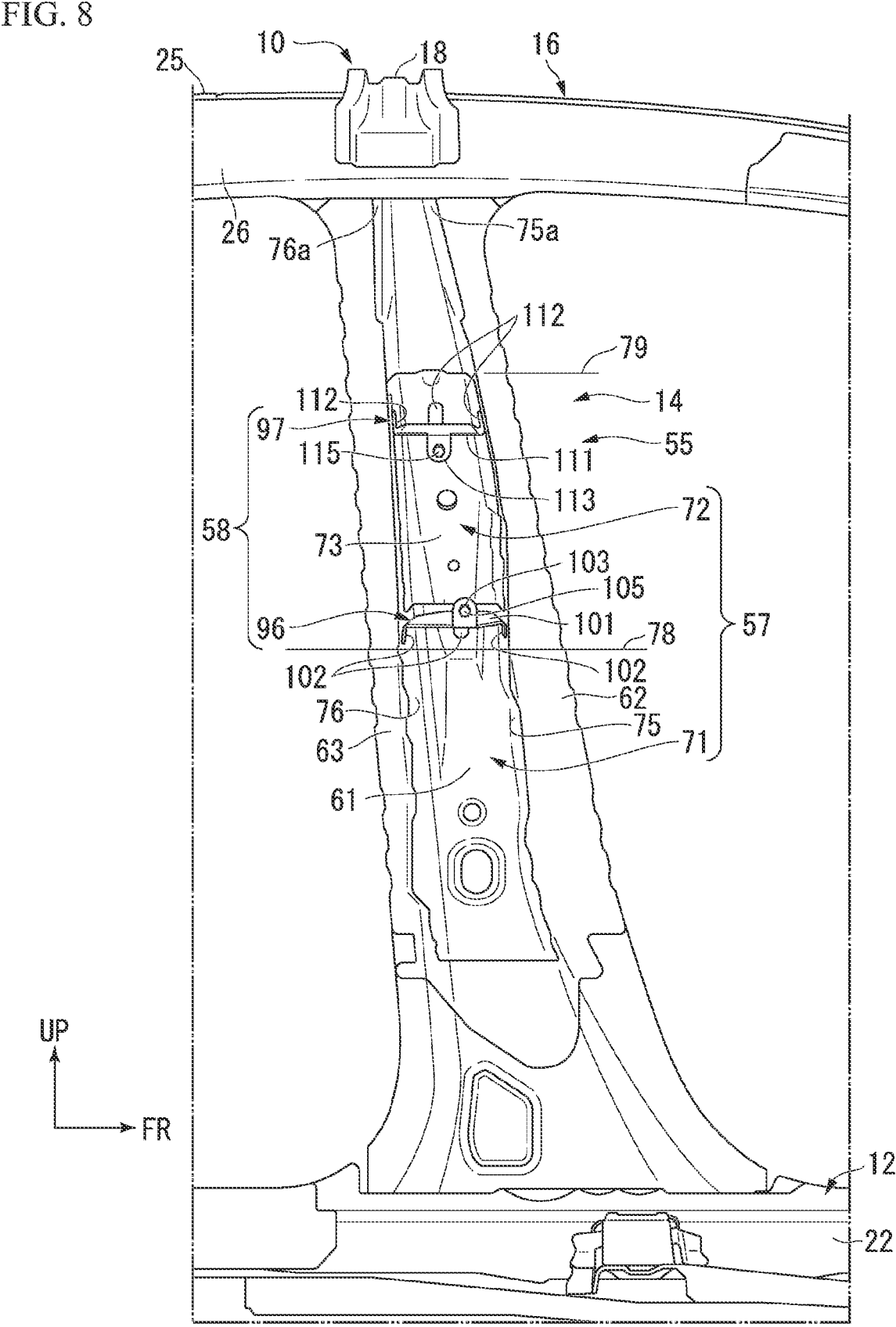
FIG. 8 is a side view of the vehicle body structure of the embodiment as viewed from a vehicle interior side.
Figure 9:
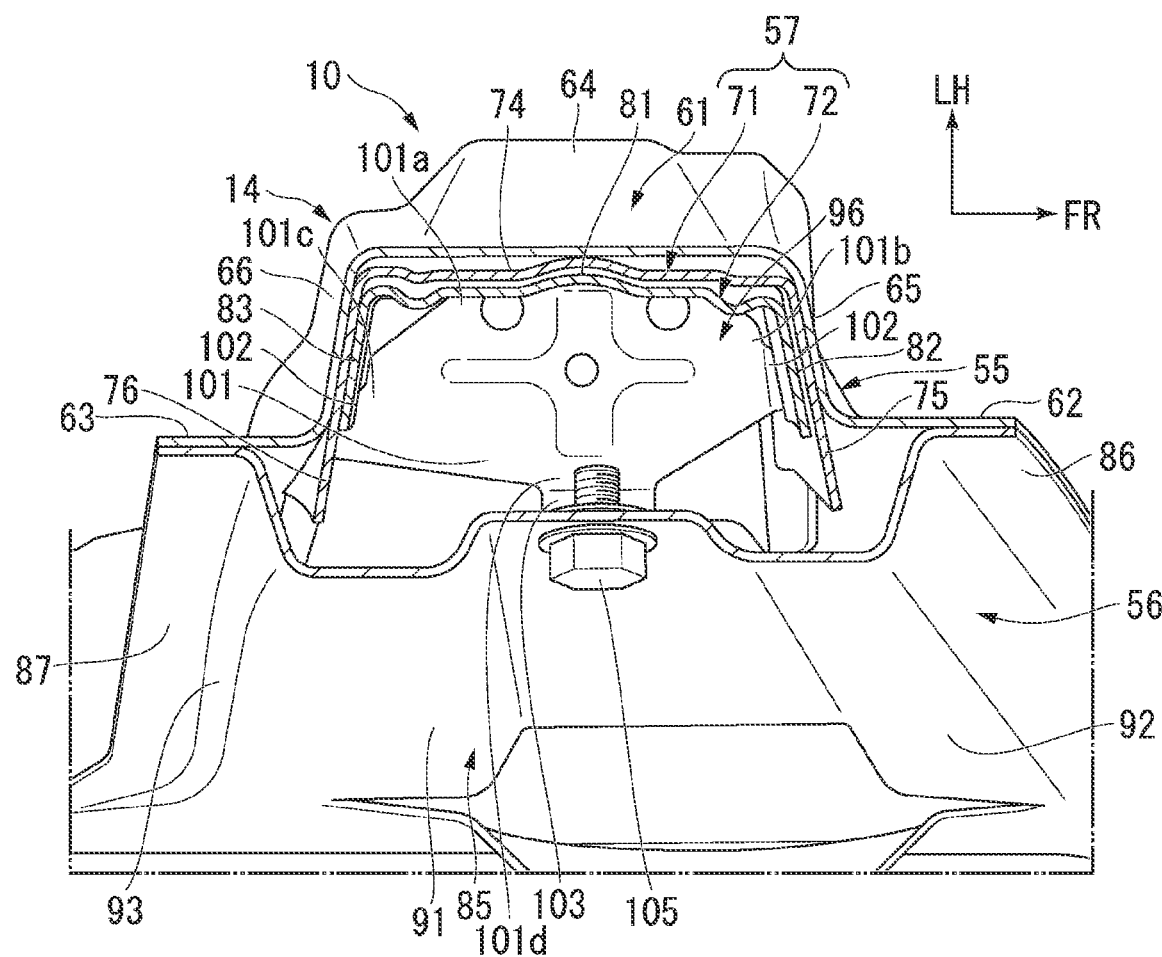
FIG. 9 is a cross-sectional view taken along the line IX-IX of FIG. 1.

As shown in FIGS. 7 to 9, the center pillar 14 is joined to the side sill 12 and the roof side rail 16. A lower end portion 14b of the center pillar 14 is joined to the side sill 12. The upper end portion 14a of the center pillar 14 is joined to the roof side rail 16. The center pillar 14 includes the outer panel 55, an inner panel 56, a stiffener 57, and a pillar bulkhead 58.

The center pillar 14 is formed to have a hollow closed cross section by joining the outer panel 55 and the inner panel 56 and the formed hollow closed cross section extends in the up and down direction. The center pillar 14 is curved toward the interior side between the roof side rail 16 and a belt line portion 78 to be described later.

(Outer Panel)

The outer panel 55 includes an outer bulging portion 61, an outer front brim portion 62, and an outer rear brim portion 63. The outer bulging portion 61 bulges toward the outside of the vehicle width direction. The outer front brim portion 62 projects from the outer bulging portion 61 toward the front side of the vehicle body. The outer rear brim portion 63 projects from the outer bulging portion 61 toward the rear side of the vehicle body.

The outer bulging portion 61 includes an outer top portion (top portion of claims) 64, an outer front side wall 65, and an outer rear side wall 66. The outer top portion 64 is disposed toward the front and rear direction of the vehicle body. The outer front side wall 65 extends from the front edge of the outer top portion 64 toward the inside of the vehicle width direction. The outer rear side wall 66 extends from the rear side of the outer top portion 64 toward the inside of the vehicle width direction.

The outer bulging portion 61 is formed to have a U-shaped cross section opening toward the inside of the vehicle width direction by the outer top portion 64, the outer front side wall 65, and the outer rear side wall 66.

The outer front brim portion 62 projects from the front opening edge of the outer bulging portion 61 (that is, the outer front side wall 65) toward the front side of the vehicle body. The outer rear brim portion 63 projects from the rear opening edge of the outer bulging portion 61 (that is, the outer rear side wall 66) toward the rear side of the vehicle body.

The outer panel 55 is formed to have a hat cross section opening toward the inside of the vehicle width direction by the outer bulging portion 61, the outer front brim portion 62, and the outer rear brim portion 63.

As shown in FIGS. 2 and 4, a lower end portion 55a of the outer panel 55 is joined to an outer surface 21c of the side sill outer panel 21. An upper end portion 55b of the outer panel 55 is joined to the concave portion 33 (specifically, the bottom portion 41 and the top portion 42) and the upper portion 43 of the concave portion 33 in the outer surface 25a of the roof side outer panel 25.

The upper end portion 55b of the outer panel 55 includes, for example, a portion 61a which bulges upward. The bulging portion 61a forms the upper end portion of the outer bulging portion 61. The bulging portion 61a is formed to surround an upper end portion 71a (described later) of the first stiffener (stiffener) 71 disposed on the concave portion 33 from above.

(Stiffener)

Returning to FIGS. 8 and 9, the stiffener 57 is disposed inside the outer bulging portion 61. The stiffener 57 includes a first stiffener 71 and a second stiffener 72. The first stiffener 71 is joined to be overlapped on the inner surface of the outer bulging portion 61. The first stiffener 71 is formed to have a U-shaped cross section along the outer top portion 64, the outer front side wall 65, and the outer rear side wall 66 of the outer bulging portion 61. The first stiffener 71 includes a first top portion 74, a first front vertical wall (vertical wall) 75, and a first rear vertical wall (vertical wall) 76. The first top portion 74 follows the outer top portion 64. The first front vertical wall 75 follows the outer front side wall 65. The first rear vertical wall (vertical wall) 76 follows the outer rear side wall 66.

The first stiffener 71 extends in the up and down direction to intersect the belt line portion (belt line) 78.

The belt line portion 78 means a line running laterally along the lower end portion of the side window glass of the vehicle body.

Figure 10:
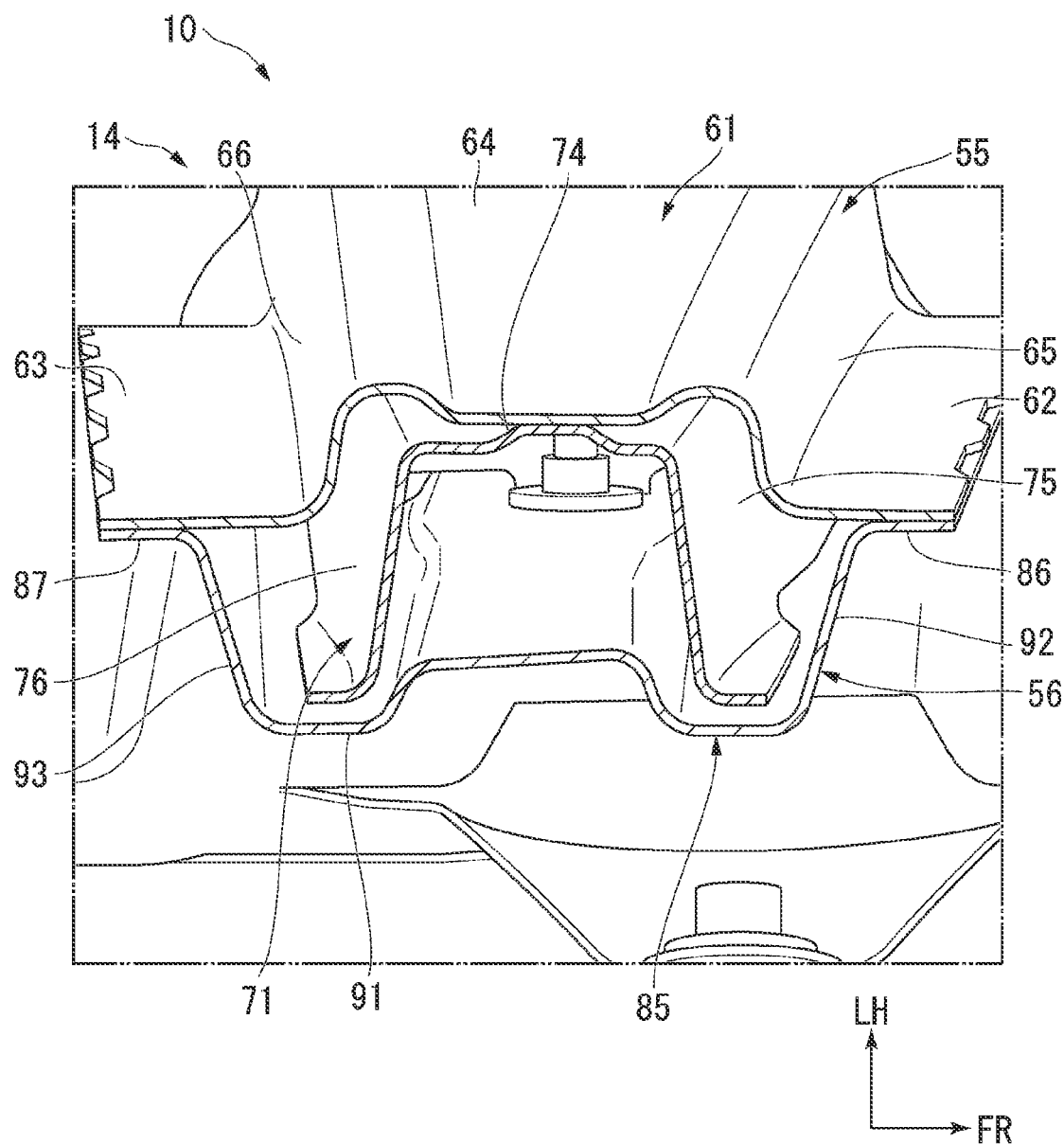
FIG. 10 is a cross-sectional view taken along the line X-X of FIG. 1.

As shown in FIGS. 4, 6, and 10, the upper end portion 71a of the first stiffener 71 is disposed on the bottom portion 41 of the concave portion 33 to be joined thereto. Specifically, the upper end portion 71a (an upper end portion 75a of the first front vertical wall 75 and an upper end portion 76a of the first rear vertical wall 76) of the first stiffener 71 is disposed on the bottom portion 41 of the concave portion 33 to be joined thereto.

The first front vertical wall 75 projects toward the inside of the vehicle width direction from the outer panel 55 of the center pillar 14 to the inner panel 56 between the roof side rail 16 (specifically, the upper end portion 75a of the first front vertical wall 75) and the belt line portion 78. The first rear vertical wall 76 projects toward the inside of the vehicle width direction from the outer panel 55 of the center pillar 14 to the inner panel 56 between the roof side rail 16 (specifically, the upper end portion 76a of the first rear vertical wall 76) and the belt line portion 78.

As shown in FIGS. 8 and 9, the second stiffener 72 is joined while being overlapped on the inner surface of the first stiffener 71. The second stiffener 72 includes a second top portion 81, a second front vertical wall 82, and a second rear vertical wall 83. The second stiffener 72 is formed to have a U-shaped cross section along the inner surface of the first stiffener 71 by the second top portion 81, the second front vertical wall 82, and the second rear vertical wall 83.

The second stiffener 72 is formed to have a height dimension smaller than that of the first stiffener 71 in the up and down direction and extends from, for example, the belt line portion 78 to an upper position 79 of the belt line.

In this way, the second stiffener 72 is overlapped on the first stiffener 71 so that a maximum plate thickness portion 73 of the stiffener 57 is formed between the belt line portion 78 and the roof side rail 16. In other words, the stiffener 57 includes the maximum plate thickness portion 73 between the belt line portion 78 the roof side rail 16. Accordingly, the strength and rigidity of the maximum plate thickness portion 73 can be increased. Additionally, the maximum plate thickness portion 73 may be formed by increasing the plate thickness of one stiffener.

In the center pillar 14, a portion which is curved toward the interior side between the roof side rail 16 and the belt line portion 78 is reinforced by the stiffener 57 against the load in the vehicle width direction.

(Inner Panel)

As shown in FIGS. 9 and 10, the inner panel 56 includes an inner bulging portion 85, an inner front brim portion 86, and an inner rear brim portion 87. The inner bulging portion 85 bulges toward the inside of the vehicle width direction. The inner front brim portion 86 projects from the inner bulging portion 85 toward the front side of the vehicle body. The inner rear brim portion 87 projects from the inner bulging portion 85 toward the rear side of the vehicle body.

The inner bulging portion 85 includes an inner top portion 91, an inner front wall 92, and an inner rear wall 93. The inner top portion 91 is disposed toward the front and rear direction of the vehicle body. The inner front wall 92 extends from the front edge of the inner top portion 91 toward the outside of the vehicle width direction. The inner rear wall 93 extends from the rear edge of the inner top portion 91 toward the inside of the vehicle width direction.

The inner bulging portion 85 is formed to have a U-shaped cross section opening toward the outside of the vehicle width direction by the inner top portion 91, the inner front wall 92, and the inner rear wall 93.

The inner front brim portion 86 projects from the front opening edge of the inner bulging portion 85 (that is, the inner front wall 92) toward the front side of the vehicle body. The inner rear brim portion 87 projects from the rear opening edge of the inner bulging portion 85 (that is, the inner rear wall 93) toward the rear side of the vehicle body.

The inner panel 56 is formed to have a hat cross section (second hat cross section) opening toward the outside of the vehicle width direction by the inner bulging portion 85, the inner front brim portion 86, and the inner rear brim portion 87.

The inner front brim portion 86 is joined to the outer front brim portion 62 of the outer panel 55. The inner rear brim portion 87 is joined to the outer rear brim portion 63 of the outer panel 55.

Accordingly, the inner panel 56 is joined to the outer panel 55 and the center pillar 14 is formed to have a hollow closed cross section by the inner panel 56 and the outer panel 55. The center pillar 14 is a highly rigid member that forms a vehicle body skeleton while extending in the up and down direction between the side sill 12 and the roof side rail 16.

As shown in FIG. 2, a lower end portion 56a of the inner panel 56 is joined to penetrate the side sill 12 in the up and down direction. That is, the lower end portion 56a of the inner panel 56 is joined while being sandwiched between the upper flange 21a of the side sill outer panel 21 and the upper flange 22a of the side sill inner panel 22. Further, the lower end portion 56a of the inner panel 56 is joined while being sandwiched between the lower flange 21b of the side sill outer panel 21 and the lower flange 22b of the side sill inner panel 22.

The lower end portion 55a of the outer panel 55 is joined to the outer surface 21c of the side sill outer panel 21. Accordingly, the lower end portion 14b of the center pillar 14 is firmly joined to the side sill 12.

As shown in FIGS. 4 and 5, an upper end portion 56b of the inner panel 56 is joined to an inner surface (vehicle interior side surface) 26a of the roof side inner panel 26. The upper end portion 55b of the outer panel 55 is joined to the concave portion 33 (specifically, the bottom portion 41 and the top portion 42) and the upper portion 43 of the concave portion 33 in the outer surface 25a of the roof side outer panel 25. Further, the upper end portion 71a of the first stiffener 71 (that is, the upper end portion 75a of the first front vertical wall 75 and the upper end portion 76a of the first rear vertical wall 76) is disposed on the bottom portion 41 of the concave portion 33 to be joined thereto.

That is, the upper end portion 14a of the center pillar 14 is firmly joined to the roof side rail 16.

(Bulkhead)

As shown in FIGS. 8 and 9, the center pillar 14 includes the pillar bulkhead 58 provided above the belt line portion 78. The pillar bulkhead 58 includes a first pillar bulkhead (pillar bulkhead) 96 and a second pillar bulkhead (pillar bulkhead) 97.

The first pillar bulkhead 96 is provided inside the first stiffener 71 above the belt line portion 78. The first pillar bulkhead 96 includes a first partition wall (partition wall) 101, a first folded flange 102, and a second folded flange 103.

The first partition wall 101 is horizontally disposed to intersect the longitudinal direction of the first stiffener 71. The first partition wall 101 includes a first outer edge 101a, a first front edge 101b, a first rear edge 101c, and a first inner edge 101d. The outline of the outer shape of the first partition wall 101 is formed along the U-shaped cross section of the first stiffener 71 by the first outer edge 101a, the first front edge 101b, and the first rear edge 101c.

The first inner edge 101d is disposed on the opening side (the side of the inner bulging portion 85) of the first stiffener 71.

The first folded flange 102 is provided in each of the first outer edge 101a, the first front edge 101b, and the first rear edge 101c. Specifically, the first folded flange 102 is bent downward along the first top portion 74 of the first stiffener 71 from the center portion of the first outer edge 101a in the front and rear direction of the vehicle body and is joined to the first top portion 74.

The first folded flange 102 is bent downward along the first front vertical wall 75 of the first stiffener 71 from the first front edge 101b and is joined to the first front vertical wall 75. Further, the first folded flange 102 is bent downward along the first rear vertical wall 76 of the first stiffener 71 from the first rear edge 101c and is joined to the first rear leg portion 67. That is, the first partition wall 101 is joined to the inside of the U-shaped cross section of the first stiffener 71 by the first folded flange 102.

The first inner edge 101d is provided with the second folded flange 103. Specifically, the second folded flange 103 is bent upward along the inner bulging portion 85 of the inner panel 56 from the center portion of the first inner edge 101d in the front and rear direction of the vehicle body and is coupled to the inner bulging portion 85 by a fastening member (for example, a bolt 105 and a nut).

In this way, the first folded flange 102 is joined to the wall portion having the U-shaped cross section of the first top portion 74, the first front vertical wall 75, and the first rear vertical wall 76 of the first stiffener 71. The second folded flange 103 is coupled to the inner bulging portion 85. Accordingly, all four wall portions having a rectangular cross section formed by the first stiffener 71 and the inner panel 56 can be restrained by the first pillar bulkhead 96 and the strength and rigidity of the center pillar 14 can be increased.

The second pillar bulkhead 97 is provided inside the second stiffener 72 of the center pillar 14. The second pillar bulkhead 97 is formed substantially symmetrically with the first pillar bulkhead 96 in the up and down direction.

The second pillar bulkhead 97 is provided inside the second stiffener 72 above the belt line portion 78. A second partition wall (partition wall) 111 of the second pillar bulkhead 97 is joined to the inside of the U-shaped cross section of the second stiffener 72 by a first folded flange 112. The second partition wall 111 is horizontally disposed to intersect the longitudinal direction of the second stiffener 72.

The second folded flange 113 of the second partition wall 111 is coupled to the inner bulging portion 85 of the inner panel 56 by a fastening member (for example, a bolt 115 and a nut). Thus, the second partition wall 111 is coupled to the inner bulging portion 85 by the second folded flange 113.

Accordingly, all four wall portions having a rectangular cross section formed by the second stiffener 72 and the inner panel 56 can be restrained by the second pillar bulkhead 97 and the strength and rigidity of the center pillar 14 can be increased.

The first stiffener 71 is provided with the first pillar bulkhead 96. The second stiffener 72 is provided with the second pillar bulkhead 97. Thus, the first pillar bulkhead 96 and the second pillar bulkhead 97 reinforce the outer front side wall 65 and the outer rear side wall 66 of the center pillar 14 (outer panel 55).

Accordingly, it is possible to suppress the outer front side wall 65 and the outer rear side wall 66 from being bent in the front and rear direction of the vehicle body due to an input load, for example, when a load is input to the center pillar 14 from the outside of the vehicle width direction due to the side collision or the like. In other words, it is possible to suppress the center pillar 14 from being deformed to collapse toward the inside of the vehicle width direction due to the input load.

<Roof Arch>

As shown in FIGS. 5 to 7, the roof arch 18 is joined to the roof arch connection portion 45a of the roof side rail 16 (specifically, the roof side inner panel 26). The roof arch 18 includes an arch bulging portion 117, an arch front brim portion 118, and an arch rear brim portion 119. The arch bulging portion 117 bulges downward. The arch front brim portion 118 projects from the arch bulging portion 117 toward the front side of the vehicle body. The arch rear brim portion 119 projects from the arch bulging portion 117 toward the rear side of the vehicle body.

The arch bulging portion 117 includes an arch top portion 121, an arch front side wall 122, and an arch rear side wall 123. The arch top portion 121 is substantially horizontally disposed. The arch front side wall 122 extends upward from the front edge of the arch top portion 121. The arch rear side wall 123 extends upward from the rear edge of the arch top portion 121.

The arch bulging portion 117 is formed to have a U-shaped cross section opening upward by the arch top portion 121, the arch front side wall 122, and the arch rear side wall 123.

The arch front brim portion 118 projects from the front opening edge of the arch bulging portion 117 (that is, the arch front side wall 122) toward the front side of the vehicle body. The arch rear brim portion 119 projects from the rear opening edge of the arch bulging portion 117 (that is, the arch rear side wall 123) toward the rear side of the vehicle body.

The roof arch 18 is formed to have a hat cross section (first hat cross section) opening upward by the arch bulging portion 117, the arch front brim portion 118, and the arch rear brim portion 119.

In the roof arch 18, the arch end portion (end portion) 18a is bent downward along the roof arch connection portion 45a in front of the roof side rail 16 (specifically, the roof arch connection portion 45a). Here, the upper end portion 56b of the inner panel 56 is formed to have a second hat cross section. Hereinafter, the upper end portion 56b of the inner panel 56 may be referred to as the "inner upper end portion 56b".

The first hat cross section of the arch end portion 18a is joined to the second hat cross section of the inner upper end portion 56b while being overlapped therewith from the inside of the vehicle width direction. An axis G1 of the roof arch 18 is formed to intersect an axis G3 of the center pillar 14 at the cross section center G2 of the roof side rail 16.

As described above, as shown in FIGS. 2, 4, and 5, according to the vehicle body structure 10, the first ridgeline 35 of the roof side outer panel 25 was continued from the front end 16a to the rear end 16b of the roof side rail 16. Accordingly, the collision load can be supported by the roof side rail 16 by transmitting the collision load (load) due to the front surface collision or the rear surface collision by the first ridgeline 35.

The bent portion 38 was formed at a position matching the roof arch connection portion 45a in the second ridgeline 36 and the concave portion 33 was formed in the roof side outer panel 25. The upper end portion 14a of the center pillar 14 was joined to the bottom portion 41 of the concave portion 33. Particularly, in the first stiffener 71, the upper end portion 71a (the upper end portion 75a of the first front vertical wall 75 and the upper end portion 76a of the first rear vertical wall 76) is disposed on the bottom portion 41 of the concave portion 33 to be joined thereto.

Thus, the upper end portion 14a of the center pillar 14 can be disposed at a position close to the roof arch 18 in the up and down direction. Thus, when a collision load F1 is input to the center pillar 14 due to the side collision, a load F2 can be efficiently transmitted from the upper end portion 14a of the center pillar 14 to the roof arch 18. Accordingly, when the collision load F1 is input to the center pillar 14, the transmission loss of the collision load from the center pillar 14 to the roof arch 18 can be reduced.

The axis G1 of the roof arch 18 is disposed at a position intersecting the axis G3 of the center pillar 14 at the cross section center 2 of the roof side rail 16.

Here, when the side collision load F1 is input to the center pillar 14 due to the side collision, a bending moment M1 around the cross section center G2 of the roof side rail 16 acts on the upper end portion 14a of the center pillar 14. Here, the axis G1 of the roof arch 18 and the axis G3 of the center pillar 14 intersected each other at the cross section center G2 of the roof side rail 16. Thus, the roof arch 18 can suppress the bending moment M1 around the cross section center G2 of the roof side rail 16. Accordingly, when the collision load F1 is input to the center pillar 14 due to the side collision, the collision load F2 can be efficiently transmitted from the upper end portion 14a of the center pillar 14 to the roof arch 18.

Further, the arch end portion 18a of the roof arch 18 is formed to have a first hat cross section. The first hat cross section of the arch end portion 18a is joined to the second hat cross section of the inner upper end portion 56b of the inner panel 56 while being overlapped therewith from the inside of the vehicle width direction. Thus, when the side collision load F1 is input to the inner panel 56 of the center pillar 14, the collision load F2 can be efficiently transmitted from the inner panel 56 to the roof arch 18.

Therefore, the depth of the hat cross section of the outer panel 55 can be made shallow while securing the transmission of the load from the center pillar 14 to the roof arch 18. Accordingly, the door window frame of the vehicle can be set thin and the surface of the vehicle can be made into a flash surface.

The flash surface means a surface structure that eliminates steps as much as possible from the surface of the vehicle in order to reduce the air resistance of the vehicle.

The rail bulkhead 28 was provided inside the hollow closed cross section of the roof side rail 16. The cross section shielding portion 51 of the rail bulkhead 28 is disposed toward the vehicle width direction to be aligned with the outer front side wall 65 of the center pillar 14 and the arch front side wall 122 of the roof arch 18 in the front and rear direction of the vehicle body. Alternatively, the cross-section shielding portion 51 is disposed toward the vehicle width direction to be aligned with the outer rear side wall 66 of the center pillar 14 and the arch rear side wall 123 of the roof arch 18 in the front and rear direction of the vehicle body.

Accordingly, when the side collision load F1 is input to the inner panel 56 of the center pillar 14, the collision load F2 can be satisfactorily transmitted to the roof arch 18 through the rail bulkhead 28 (particularly, the cross-section shielding portion 51 of the rail bulkhead 28).

Further, the roof side rail 16 is provided with the rail reinforcing member 27 and the rail reinforcing member 27 is opposed to the rail bulkhead 28. Thus, when the side collision load F1 is input to the inner panel 56 of the center pillar 14, the collision load F2 can be satisfactorily received by the rail reinforcing member 27 and the received collision load F2 can be transmitted from the rail reinforcing member 27 to the rail bulkhead 28. Accordingly, the collision load F2 can be satisfactorily transmitted to the roof arch 18 through the rail reinforcing member 27 and the rail bulkhead 28.

In the first stiffener 71, the upper end portion 71a (the upper end portion 75a of the first front vertical wall 75 and the upper end portion 76a of the first rear vertical wall 76) is disposed on the bottom portion 41 of the concave portion 33 to be joined thereto. Further, the first front vertical wall 75 of the first stiffener 71 projects toward the inside of the vehicle width direction from the outer panel 55 to the inner panel 56 of the center pillar 14 between the roof side rail 16 (the upper end portion 75a of the first front vertical wall 75) and the belt line portion 78. Similarly, the first rear vertical wall 76 of the first stiffener 71 projects toward the inside of the vehicle width direction from the outer panel 55 to the inner panel 56 of the center pillar 14 between the roof side rail 16 (the upper end portion 76a of the first rear vertical wall 76) and the belt line portion 78.

Thus, the center pillar 14 which is curved toward the interior side between the roof side rail 16 and the belt line portion 78 can be reinforced by the stiffener 57 against the side collision load F1 in the vehicle width direction. Accordingly, the stiffener 57 can suppress the cross section of the center pillar 14 from being deformed to collapse in the vehicle width direction, for example, when a minus bending moment M1 acts on the center pillar 14 in the vicinity of the roof side rail 16 which is the upper fulcrum of the side collision. Thus, the collision load F2 can be efficiently transmitted from the inner panel 56 to the roof arch 18.

Further, the first stiffener 71 is formed to have a U-shaped cross section along the outer top portion 64, the outer front side wall 65, and the outer rear side wall 66 of the outer bulging portion 61. The first stiffener 71 extends in the up and down direction to intersect the belt line portion 78. Thus, the stiffener 57 can increase the strength and rigidity in the range of the center pillar 14 interfering with a collision object due to the side collision.

That is, the collision load F1 input to the center pillar 14 due to the side collision can be satisfactorily distributed to the upper roof side rail 16 as the collision load F2 and to the lower side sill 12 as a collision load F3. Accordingly, the collision load F1 input to the center pillar 14 due to the side collision can be supported by the roof side rail 16 and the side sill 12.

The second stiffener 72 is overlapped on the first stiffener 71 and the maximum plate thickness portion 73 of the stiffener 57 is formed between the belt line portion 78 and the roof side rail 16. Thus, it is possible to increase the strength and rigidity of a portion in which the maximum bending moment occurs in the event of the side collision. Accordingly, the collision load F1 input due to the side collision can be satisfactorily distributed to the upper roof side rail 16 as the collision load F2 and to the lower side sill 12 as the collision load F3.

Further, the first pillar bulkhead 96 and the second pillar bulkhead 97 are provided above the belt line portion 78. The first partition wall 101 of the first pillar bulkhead 96 is horizontally disposed to intersect the longitudinal direction of the first stiffener 71. Further, the second partition wall 111 of the second pillar bulkhead 97 is horizontally disposed to intersect the longitudinal direction of the second stiffener 72.

Thus, the center pillar 14 in the range above the belt line portion 78 can be reinforced by the first pillar bulkhead 96 and the second pillar bulkhead 97 against the load in the front and rear direction of the vehicle body. Accordingly, for example, a plus bending moment acts on the center pillar 14 in the range above the belt line portion 78 interfering with a collision object due to the side collision. In this case, the first pillar bulkhead 96 and the second pillar bulkhead 97 can suppress the cross section of the center pillar 14 from being deformed to collapse in the front and rear direction of the vehicle body. Thus, the collision load F1 input due to the side collision can be satisfactorily distributed to the upper roof side rail 16 as the collision load F2 and to the lower side sill 12 as the collision load F3.

The upper end portion 55b of the outer panel 55 is joined to the bottom portion 41 and the top portion 42 of the concave portion 33 or the upper portion 43 of the concave portion 33 in the outer surface 25a of the roof side outer panel 25. Thus, the upper end portion 14a of the center pillar 14 is firmly joined to the roof side rail 16. Accordingly, when the side collision load F1 is input to the center pillar 14, the collision load F2 can be efficiently transmitted to the roof arch 18 through the roof side rail 16.

Although preferable embodiments of the present invention have been described above, the present invention is not limited to these embodiments. It is possible to add, omit, replace, and make other changes to the configuration without departing from the spirit of the present invention. The present invention is not limited by the above description, but only by the appended claims.

REFERENCE SIGNS LIST

10 Vehicle body structure
12 Side sill
14 Center pillar
14a Upper end portion of center pillar
14b Lower end portion of center pillar
16 Roof side rail
16a Front end of roof side rail
16b Rear end of roof side rail
18 Roof arch
18a Arch end portion (end portion)
25 Roof side outer panel (outer wall)
26 Roof side inner panel (inner wall)
27 Rail reinforcing member (reinforcing member)
28 Rail bulkhead
31 Outer upper flange (roof top portion)
32 Outer lower flange (lower flange)
33 Concave portion
35 First ridgeline
36 Second ridgeline
38 Bent portion
41 Bottom portion
42 Top portion
45a Roof arch connection portion
48 Roof panel
51 Cross-section shielding portion
55 Outer panel
55b Upper end portion of outer panel
56 Inner panel
57 Stiffener
58 Pillar bulkhead
64 Outer top portion (top portion)
65 Outer front side wall (one of pair of side walls)
66 Outer rear side wall (the other of pair of side walls)
71 First stiffener (stiffener)
71a Upper end portion of first stiffener
72 Second stiffener
73 Maximum plate thickness portion
75 First front vertical wall (vertical wall)
75a Upper end portion of first front vertical wall
76 First rear vertical wall (vertical wall)
76a Upper end portion of first rear vertical wall
78 Belt line portion (belt line)
96 First pillar bulkhead (pillar bulkhead)
97 Second pillar bulkhead (pillar bulkhead)
101 First partition wall (partition wall)
111 Second partition wall (partition wall)
122 Arch front side wall (one of pair of side walls)
123 Arch rear side wall (the other of pair of side walls)
G1 Axis of roof arch
G2 Cross-section center of roof side rail
G3 Axis of center pillar

What is claimed is:

1. A vehicle body structure comprising:
a roof side rail which extends in a front and rear direction of a vehicle body on a lateral side above the vehicle body and which forms a hollow closed cross section by an inner wall and an outer wall;
a roof arch which is joined to a roof arch connection portion of the inner wall; and
a center pillar of which an upper end portion is joined to the roof side rail and a lower end portion is joined to a side sill,
wherein the outer wall includes a first ridgeline and a second ridgeline which are provided above and below and a concave portion which is provided in the second ridgeline,
wherein the first ridgeline continuously extends from a front end to a rear end of the roof side rail so that a load input from the front and rear direction of the vehicle body is able to be transmitted to the roof side rail,
wherein the second ridgeline includes a bent portion which is recessed toward the first ridgeline to form the concave portion at a position matching the roof arch connection portion in the front and rear direction of the vehicle body, and
wherein the upper end portion of the center pillar is joined to the concave portion.

2. The vehicle body structure according to claim 1, wherein an axis of the roof arch and an axis of the center pillar intersect each other at a cross section center of the roof side rail.

3. The vehicle body structure according to claim 1, wherein the roof arch is formed with a first hat cross section opening upward such that an end portion is bent downward in front of the inner wall of the roof side rail, and
wherein the center pillar includes an inner panel which is formed with a second hat cross section to be overlapped along the first hat cross section of the end portion.

4. The vehicle body structure according to claim 1, wherein the center pillar includes a stiffener which is disposed therein and includes a vertical wall extending in a vehicle width direction, and
wherein in the stiffener, an upper end portion of the vertical wall is disposed in the concave portion and the vertical wall projects from an outer panel to the inner panel of the center pillar between the roof side rail and a belt line.

5. The vehicle body structure according to claim 4, wherein the center pillar includes a pillar bulkhead which includes a partition wall disposed horizontally above the belt line.

6. The vehicle body structure according to claim 4, wherein the stiffener is formed to have a U-shaped cross section along a top portion and a pair of side walls of the outer panel of the center pillar and extends in the up and down direction to intersect the belt line.

7. The vehicle body structure according to claim 4, wherein the stiffener includes a maximum plate thickness portion between the belt line and the roof side rail.

8. The vehicle body structure according to claim 4, wherein the concave portion includes a bottom portion which is connected to a lower flange of the roof side rail and a top portion which projects from the bottom portion to the bent portion, and
wherein the outer panel of the center pillar includes an upper end portion which surrounds an upper end portion of the stiffener disposed in the concave portion and is joined to the bottom portion and the top portion.

9. The vehicle body structure according to claim 1, wherein the roof side rail includes a rail bulkhead which has a cross section shielding portion formed on at least one side wall of the roof arch and the center pillar to be aligned in the front and rear direction of the vehicle body and is joined to the outer wall or the inner wall.

10. The vehicle body structure according to claim 9, wherein the rail bulkhead is formed to have any one of a hat cross section, a crank cross section, and a U-shaped cross section.

11. The vehicle body structure according to claim 1, wherein the roof side rail includes the outer wall which is formed to have a U-shaped cross section opening toward the inside of the vehicle width direction and has a roof top portion to which a roof panel is joined and the inner wall which is formed to have an L-shaped cross section to be able to be joined to the outer wall from the inside of the vehicle width direction.

12. The vehicle body structure according to claim 9, wherein the roof side rail includes a reinforcing member facing the rail bulkhead.

\* \* \* \* \*